United States Patent

Savarieau

[15] 3,645,482
[45] Feb. 29, 1972

[54] TOWING DEVICE FOR SLEEVES TOWED BY AN AIRCRAFT

[72] Inventor: Henri Savarieau, Montgeron, France
[73] Assignee: R. Alkan & Cie, Paris, France
[22] Filed: Oct. 21, 1970
[21] Appl. No.: 82,737

[30] Foreign Application Priority Data

Oct. 29, 1969 France....................................6937184

[52] U.S. Cl..............................244/137, 244/1 TD, 244/3, 273/105.3, 40/215
[51] Int. Cl.............................................................B64d 3/00
[58] Field of Search.....................244/137, 118, 1 TD, 2, 3; 273/105.3; 40/215

[56] References Cited

UNITED STATES PATENTS

| | | | |
|---|---|---|---|
| 2,460,294 | 2/1949 | Jessen | 273/105.3 |
| 2,487,055 | 11/1949 | Jessen | 273/105.3 |
| 2,604,324 | 7/1952 | Weir | 273/105.3 |

Primary Examiner—Trygve M. Blix
Assistant Examiner—Steven W. Weinrieb
Attorney—Linton & Linton

[57] ABSTRACT

The sleeve exchange device for sleeves towed by an aircraft comprises a hollow external element attached to the end of a towing rope wound by a winch on the towing aircraft. This external element comprises on its outer peripheral surface a single circular set of balls adapted either to project therefrom or to recede in recesses for retaining or releasing rings to which are anchored the launched sleeves. The balls are operated by the movement within the external element of an internal element traversed by the rope. The device comprises also a hollow supporting member rigid with the aircraft and having disposed therearound the rings for anchoring the sleeves to be launched, this supporting member comprising on its outer peripheral surface another circular set of balls adapted to project from or recede into suitable recesses under the control of a guide member adapted to move within the supporting member and to coact with the internal element when the rope is wound.

3 Claims, 4 Drawing Figures

Patented Feb. 29, 1972

3,645,482

INVENTOR
HENRI SAVARIEAU
By Linton and Linton
ATTORNEYS

TOWING DEVICE FOR SLEEVES TOWED BY AN AIRCRAFT

In aerial firing practice it is known to use targets in the form of sleeves or flexible panels connected to a cable or rope towed by an aircraft.

In the most known systems an operator launches the sleeves through an appropriate orifice from the cockpit or cabin or fuselage of the towing aircraft. A disadvantage of such systems is the need for an operator other than the pilot and the need for the operator to be able to move about the aircraft so as to launch the sleeves at the appropriate time.

The present invention concerns a device for launching sleeves or panels from an aircraft, which is adapted to be mounted outside the aircraft, the device being controllable from the pilot's seat so that one or a consecutive number of sleeves or panels can be launched on a single towing cable. Clearly, a device of this kind makes it possible more particularly to use single seater towing aircrafts.

The device consists of chambers secured under the aircraft and comprising each a hollow compartment containing a sleeve to be launched, this compartment being designed with a view to be propelled backwards within said chamber through a predetermined length under the action of a pilot-controlled ejection device for launching the sleeve attached to the free end of a towing rope.

The invention concerns particularly a device permitting of detaching a damaged sleeve from the end of the towing rope and its replacement by a fresh sleeve. In such known devices, the end of the towing rope may be attached to a movable member comprising means for receiving and releasing a ring connected to a sleeve which has been launched, said means being controlled by the movement of a piston which abuts a stationary part carried by the aircraft when the rope is wound by means of a winch in the aircraft. In such a device, when a sleeve is launched, it is stopped by the movable member attached to the rope which must then carry the large force necessary for retaining the launched sleeve when it is opened by the airflow. It is thus necessary to use a very strong cable and the whole equipment must have a corresponding large size and weight.

The purpose of the invention is to avoid such a disadvantage and to retain a sleeve which has just been launched by the stationary part connected to the aircraft instead of retaining it by the rope, whereas the sleeve after having been opened is transferred to the rope when said sleeve is submitted to the usual force due to the dynamical action of the airflow in such a manner that the overstress due to the opening of the sleeve is carried by the stationary part instead of being carried by the rope.

According to the invention, the movable member attached to the rope is an external hollow element provided with a single circular set of balls of which the ejection for retaining the ring of the launched sleeve is controlled by the displacement of an internal element in relation to the external element, whereas a second circular set of balls is housed in peripheral recesses of a supporting member rigid with the tow-plane and adapted to recede into said recesses or alternately to emerge therefrom under the control of a suitable guide member adapted to slide within said supporting member, when cooperating with the movable member.

According to an additional feature of the invention, the internal element is adapted to slide in the external element against the resistance of a first compression spring and the guide member is adapted to slide within the supporting member against the action of a second compression spring, said first compression spring being stronger than said second compression spring so as to permit, when launching a fresh sleeve, the movement of the ball ring of the external element before the ball ring of the supporting member is retracted, with a view to lock said sleeve to the tail end of the towing rope.

In order to afford a clearer understanding of this invention a typical form of embodiment thereof will now be described by way of example with reference to the attached drawing.

Figure 1:
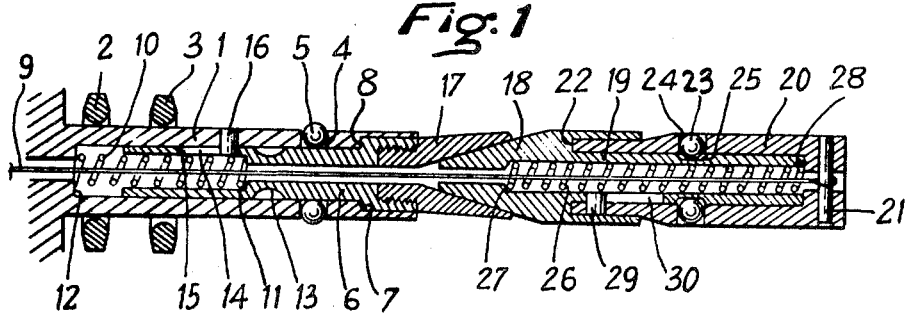
FIG. 1 is a longitudinal section of the sleeve replacement device in the position permitting the release of a damaged sleeve.

Referring to the drawing, the reference numeral 1 designates a cylindrical hollow support rigid with the tow-plane; a pair of rings 2, 3 each connected to one of the two sleeves to be launched are slidably fitted on the outer surface of said support 1. This support 1 has formed in its outer surface a plurality of recesses 4 adapted to receive a circular set of balls 5 adapted to either project a few millimeters from said outer surface or recede completely within said recesses 4. Inside the hollow support 1 a guide member 6 is slidably mounted and comprises near the outer end of said support a shoulder 7 adapted to engage an inner shoulder 8 of said cylindrical support 1. The guide member 6 receives throughout its length the towing rope 9 having one end anchored to the drum of a winch carried by the aircraft (not shown) and has fitted therein a compression spring 10 reacting with one end against an inner shoulder 11 of guide member 6 and with the opposite end against an inner shoulder 12 of support 1.

The guide member 6 comprises an external peripheral groove 13 adapted, in the outermost position of said guide member 6 in relation to said support 1, to coact with the ball ring 5 to enable the balls thereof to recede completely within the recesses 4 of support 1, and a cavity 14 the wall 15 of which is adapted to engage a transverse pin 16 rigid with support 1 for limiting, as will be explained presently, the outward stroke of guide member 6 to the rear of support 1 due to the action of spring 10.

The end of guide member 6 which emerges from member 1 is rigid with a tapered member 17 consisting of a material having a certain flexibility and adapted to receive the head 18 of corresponding taper of a movable cylindro-conical member 19 of the sleeve replacement device along which an external member 20 is adapted to slide and to abut with one end against the bottom of a groove 22 formed in said head 18, said element 20 being assembled by means of a cross pin 21 with the free end of the towing rope 9 extending through said member 19 and element 20. A circular set of balls 23 is disposed in peripheral recesses 24 of the external element 20 so as to either project from said recesses 24 externally of said element, or recede completely within said recesses 24 when said balls engage a groove 25 formed in the outer periphery of member 19. This movable member 19 comprises internally a compression spring 26 stronger than spring 10 and reacting with one end against a shoulder 27 formed in said head 18 and with the other end against another shoulder 28 formed in said element 20. The sliding movement of this element 20 along the member 19 is limited in one direction by the engagement thereof with the bottom of groove 22 (in which position the balls 23 register with the groove 25) and in the opposite direction by the engagement of a transverse or radial pin 29 of element 20 with the end of an opening 30 formed in member 19 and slidably engaged by said radial pin 29.

Now the operation of the device will be described with reference to the drawing. In FIG. 1 the two sleeves to be launched in succession are assumed to be enclosed in their launching devices (not shown) respectively, and the rings 2, 3 to which said sleeves are attached are slipped on the support 1. The towing rope 9 is reeled home on its winch so that the head 18 of movable member 19 engages the female cone 17 and the springs 10 and 26 are compressed by the tension or rope 9. In this position the element 20 abuts against the bottom of groove 22, thus causing the balls 23 to register with the groove 25 formed in said member 19 and consequently the balls 23 to recede within the recesses 24 (to permit the release of the damaged sleeve, as will be seen presently). Moreover, the balls 5 coacting with the solid portions of guide member 6 project from the recesses 4 of support 1, thus preventing the passage of ring 3 towards the assembly 19–20.

Figure 2:
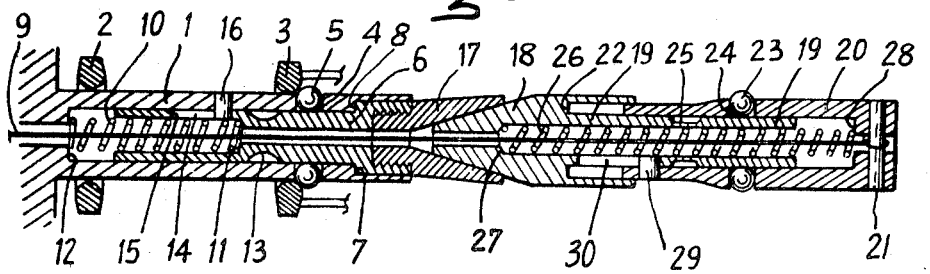
FIG. 2 is a view similar to FIG. 1 showing the sleeve replacement device ready for receiving a fresh sleeve.
Figure 3:
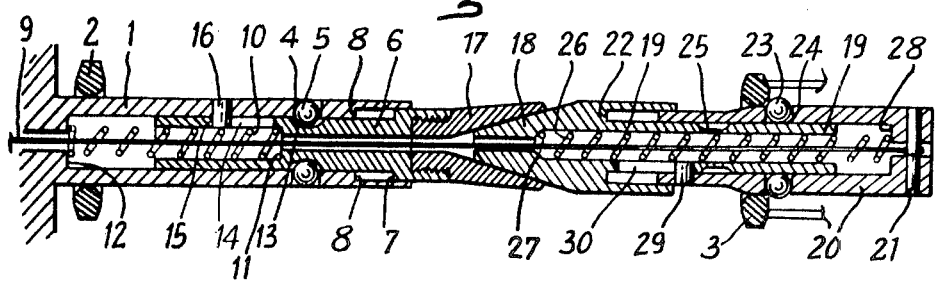
FIG. 3 is a similar view of the sleeve replacement device properly positioned for permitting the anchoring of the fresh sleeve to the tail end of the towing rope.
Figure 4:
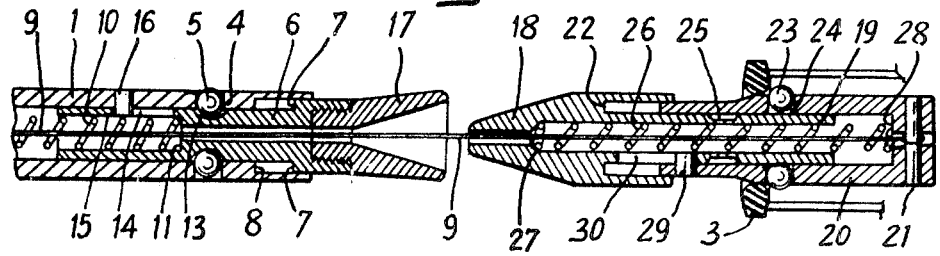
FIG. 4 is a similar view of the sleeve replacement device during the paying out of the towing rope.

When the first sleeve is being launched (see FIG. 2) its ring 3 is held by abutting the circular set of balls 5 projecting from support 1. Then the launching rope 9 is gradually paid out and since spring 26 is stronger than spring 10 it expands first and pushes the element 20, thus causing the balls 23 to emerge from their recesses 24. As the rope 9 continues to be reeled out (see FIG. 3), spring 10 expands in turn and causes the movement of guide member 6 which abuts with the wall 15 of its cavity 14 against the transverse pin 16; in this position the groove 13 registers with the balls 5, thus causing the retraction of these balls inside the recesses 4 to free the ring 3 which then abuts against the balls 23 of the next set and reaches the normal operative position shown in FIG. 4, after a suitable length of rope 9 has been paid out.

Under these conditions it is clear that when it is desired to release the sleeve attached to ring 3 (for example because it is damaged) and then replace it with a fresh sleeve attached to ring 2, the reverse operation is performed. The rope 9 is wound so that the head 18 of movable member 19 penetrates into the tapered cavity of member 17, the tension of rope 9 firstly compressing spring 10, thus moving the guide member 6 and causing the balls 5 to emerge outwards. Then the other spring 26 is compressed in turn so that the end of element 20 abuts against the bottom of groove 22, and in this position (FIG. 1) the balls 23 are retracted to permit the release of the damaged sleeve, whereafter the above-described operation is repeated for positioning the fresh sleeve attached to ring 2.

It will be readily understood by those conversant with the art that the specific form of embodiment described hereinabove and illustrated in the attached drawing lends itself to various modifications and variations without departing from the scope of the invention as disclosed in the attached claims.

What I claim is:

1. A sleeve exchange device for substituting sleeves towed by an aircraft by means of a rope, comprising a hollow external element attached to the end of a towing rope adapted to be wound on a winch in a towing tow-plane and comprising on its outer peripheral surface a single circular set of balls projecting therefrom or adapted to recede in recesses, a hollow internal element traversed by the rope and adapted for operating said balls when moved within said external element, a hollow supporting member rigid with the aircraft and having disposed therearound rings for anchoring the sleeves to be released, said hollow supporting member through which the rope can be wound or unwound comprising on its outer peripheral surface another circular set of balls also adapted to project from or recede into suitable recesses, and a guide member movable within said supporting member for operating said other set of balls and adapted to coact with said internal element when the rope is wound.

2. A sleeve exchange device according to claim 1, characterized in that the sliding movement of said internal element within said external element takes place under the thrust of a first compression spring and that the sliding movement of said guide member within said supporting member takes place against the action of a second compression spring, said first compression spring being stronger than said second compression spring.

3. A sleeve exchange device according to claim 1, characterized in that said guide member comprises a tapered hollow end piece of flexible material adapted, during the exchange of a damaged sleeve with a fresh sleeve, to receive the end portion of corresponding contour of said internal element.

* * * * *